United States Patent [19]

Mosimann et al.

[11] 3,869,428

[45] Mar. 4, 1975

[54] ENAMEL COMPOSITION FOR THE MANUFACTURE OF SOLDERABLE ENAMELED WIRES

[75] Inventors: Hans Mosimann, Breitenbach; Peter Heim, Basle; Charles Borer, Grindel, all of Switzerland

[73] Assignee: Schweizerische Isola-Werke, Breitenbach, Switzerland

[22] Filed: May 2, 1973

[21] Appl. No.: 356,451

Related U.S. Application Data

[63] Continuation-in-part of Ser. No. 37,355, May 14, 1970, abandoned.

[30] Foreign Application Priority Data

May 14, 1969 Switzerland.......................... 7362/69

[52] U.S. Cl................... 260/77.5 AQ, 260/77.5 AT, TB, 260/77.5 NC

[51] Int. Cl...................... C08g 22/06, C08g 53/20

[58] Field of Search... 260/77.5 TB, 77.5 R, 77.5 NC, 260/77.5 AQ

[56] References Cited

UNITED STATES PATENTS

| | | | |
|---|---|---|---|
| 3,174,950 | 3/1965 | Cordier | 260/77.5 NC |
| 3,314,923 | 4/1967 | Muller et al. | 260/77.5 R |
| 3,342,780 | 9/1967 | Meyer et al. | 260/77.5 NC |
| 3,491,060 | 1/1970 | Schminke | 260/77.5 R |
| 3,493,540 | 2/1970 | Muller et al. | 260/77.5 R |
| 3,555,113 | 1/1971 | Sattler | 260/77.5 NC |
| 3,716,519 | 2/1973 | Yoda et al. | 260/77.5 R |

*Primary Examiner*—H. S. Cookeram
*Attorney, Agent, or Firm*—Wenderoth, Lind & Ponack

[57] ABSTRACT

An enamel composition containing imide and urethane groups useful for the manufacture of solderable enamel wires consisting of the reaction product of an aromatic hydroxyl compound and an aromatic isocyanate compound, at least one of these compounds containing imide groups and reacted with each other in a stoichimetric ratio in respect to the hydroxyl and isocyanate groups corresponding to urethane formation.

2 Claims, No Drawings

ENAMEL COMPOSITION FOR THE MANUFACTURE OF SOLDERABLE ENAMELED WIRES

This is a continuation-in-part of application Ser. No. 37,355, filed May 14, 1970, and now abandoned.

The invention relates to a new enamel composition containing imide and urethane groups and useful for the manufacture of solderable enamelled wires.

The manufacture of armatures for high-speed small electric motors is one of the most difficult and delicate winding jobs in existence. Naturally the most stringent demands are placed on the wires which are used. Although many designers have been applying enamelled wires with a heavier layer of varnish for the past twenty years, it was necessary repeatedly in special cases up until a few years ago to provide the enamelled wires with an additional covering if one did not wish to run the risk of failures. Such wires were naturally expensive and took up a great deal of winding space.

Wires of this type of winding must fulfil the following main conditions: for the processing a good mechanical strength, namely abrasion resistance and extensibility, and a good anti-friction property (space factor); for service a good impregnability and a good capability of withstanding electric overload.

Most of the failures which were experienced in small-armature windings in the course of recent years were directly related to insufficient hot compressive strength and insufficient overloadability of the varnish insulation of the wires.

These requirements cannot be fulfilled by the conventional polyurethane coated solderable wires. The anti-friction property and, to a limited degree, the impregnability and the mechanical strength may be satisfactory, but the overloadability and the thermal behaviour are completely unsatisfactory. Practical experience has shown that this type of wire cannot be employed, except for toy motors and, at best, motors of hair dryers.

On the other hand, there is the problem of the connections of the coils with the commutator. Wires which can be soldered without stripping would be very suitable here.

More recently, people have begun to make the connections to the commutators in the motors of electric hand tools which are highly stressed thermally, such as drills, grinders and similar tools by means of caulk welding. This is done by inserting the coil ends into the commutator segments and by caulking them with simultaneous electric resistance heating, so that perfect connections result, because the insulation is destroyed by the influence of the heat. But there are still a number of motor manufacturers who, for one reason or another cannot or do not want to make use of this technique. In the past, these people were forced to strip the wire ends very carefully. Naturally these are very thin wires, and stripping them always involves difficulties, regardless of whether it is done with pickling media, mechanically or any other way. Solderable wires have been known for a long time which can be tin-plated at tin bath temperatures around 450°C (e.g. certain polyesters and polyester-imides). But this bath temperature is critical, particularly for thin wires, because the copper is melted very rapidly by forming an alloy with tin. With all of these methods, a weakening of the conductor results, and this precisely at the point on the commutator outlet which is subject to heavy mechanical stressing in any case.

Solderable coatings are usually applied to wires having a flat profile of about 30 × 5 mm or wires as this as 0,02 mm, which wires are divided into strands or thin coils. The enamel coatings applied to such wires are conventionally made from bifunctional and trifunctional polyester-alcohols and at least one difunctional masked isocyanate.

The chemistry of the reactions which occur when using the aforementioned enamelled wires is described in O. Bayer: "The Diisocyanate Addition Process," Hauser, Munich, 1963. The polyurethane enamels are very good insulating enamels. One of the advantages of such enamels, is that wires coated with such enamels are capable of being soldered in a tin bath at about 350°C, which has permitted new, advantageous methods to be used in the manufacture of fine wires and strands. But the thermal properties are absolutely insufficient for the purposes mentioned above and they are even decreased by the addition of high molecular weight polymeric materials such as polyamides, polyvinyl formal and similar substances, which are added to overcome the very low viscosity in the stoving zone of the oven. Such modified solderable polyurethane coated wires are classified under Class E (120°C continuous temperature) according to CEI. They are also relatively sensitive to various solvents and are, at least without additives, not suitable for windings which are subject to severe mechanical stresses, since the enamel is easily damaged either by softening or by abrasion.

Enamelled wires of higher temperature resistance, e.g., classified as class B = 130°C, F = 155°C or even class H = 180°C, are well known at the present time. This group however also does not contain any enamel-wire combination which can be stripped at the normal soldering bath temperatures of around 350°C. Some polyesters are solderable at about 400°C. Polyesters of higher heat resistance, based on terephtalic or isophtalic acid are not solderable even at 500°C. An other disadvantage of these ester-based lacquers was that while they displayed higher long-term temperature resistances, the enamel layer did not withstand sudden heating in the highly stretched state such as principally occurs in the case of flat profiles bent edgeways, that is, the lacquer layer cracked under the heat-shock conditions.

Various types of polyester-imides, polyamide-imides and polyimides have also been used to manufacture wires which are mechanically and electrically good and thermally belong to classes F, H or even C, depending on the composition but which are not solderable up to 500°C.

It has already been mentioned that enamel compositions on the basis of esterimides, e.g. Terebec FH (Dr. Beck and Co., Hamburg-Germany) or Terasod 357 (The P. D. George Co., St. Louis, Mo.) are solderable only at about 450°C or higher temperatures, whereas they fulfil the requirements in respect of the other mechanical, thermal and electrical properties. On the contrary, enamel compositions on the basis of polyurethanes, e.g. Supradurit LK 19 (Dr. Beck and Co., Hamburg-Germany), are solderable as requested at about 350°C, whereas the other thermal and mechanical properties are wholly insufficient as has been pointed to above.

Unexpectedly, it has now been found an enamel composition which, upon application on the wires and stoving, results in an enamel or coating comprising either imide and urethane groups in the molecule, this enamelled wires being solderable at a temperature of about 350°C while exhibiting excellent mechanical, thermal and electrical properties. In fact, enamels corresponding to the composition according to the invention are closely comparable with polyurethane enamels in respect of solderability, hence fulfiling the first and decisive condition set with the use intended for: at the same time, said enamels are closely comparable with standard polyester-imide enamels in respect of the other properties (see Table I hereinafter). The invention them provides a new enamel composition with a combination of properties which has hitherto not been achieved.

Actually, when considering the behaviour of the already known enamel compositions stated above, combining either imide and urethane groups in the molecule would be expected to result in an enamel with properties intermediate between those of the polyurethane enamels and those of the polyester-imide enamels, i.e. a temperature of solderability decreased as compared with the one of the polyester-imides but a corresponding diminution of their other valuable properties or, conversely, some improvement of the thermal and mechanical properties as compared with the polyurethanes but upon sacrifice of the required low temperature of solderability. It was therefor all the more surprising that the new enamel composition shows the optimal combination of properties mentioned above.

If the compositions mentioned are applied as an enamel onto wire, crosslinked molecules form on the wire which display imide and urethane groups as linking elements of the structural units. Special properties of the enamel manufactured in this way depend on the starting materials and on the proportionate distribution of the various structural units and types of bonds.

The alcohols which correspond to the symbols X and y are ethylene glycol, propylene glycol, butylene glycol, diethylene glycol, triethylene glycol, glycerine, trimethylolpropane and tris-(2-hydroxyethyl)-isocyanurate.

The first ester-imide compound A recited above may be produced by reacting 2 mols of trimellitic anhydride and 1 mol of diamino-diphenylmethane and subsequent esterification of the thus obtained dicarboxylic acid with

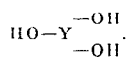

Trimellitic anhydride can also be reacted with glycine to give the corresponding iminodicarboxylic acid of the formula

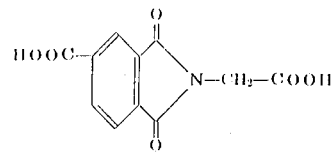

which subsequently is esterified with the mixture of alcohols mentioned hereinbefore, thus resulting in the second ester-imide compound A recited above.

From the isocyanate compounds recited above (B), the compound corresponding to the third formula is "Desmodur L," the compound corresponding to the fourth and last formula is diphenylmethane-4,4'-diisocyanate or "Desmodur 44" (register tradenames). The imide groups-containing isocyanate compounds of

TABLE I

| Tested Property | Polyurethane enamel (Supradurit LK 19) | Polyesterimide enamel (Terebec FH) | Polyesterimide enamel (Terasod 357) | Polyurethane reaction product enamel according to the invention | |
|---|---|---|---|---|---|
| | | | | Example 1 | Example 5 |
| 1. Solderability | 335 – 350°C | 450 – 480°C | 440 – 470°C | 330 – 340°C | 350 – 370°C |
| 2. Cut-through temperature | 200°C | 260°C | 270°C | 250°C | 270°C |
| 3. tg δ intersection point | 130°C | 160°C | 160°C | 160°C | 170°C |
| 4. Heat shock | | | | | |
| −30 min at 175 °C | 3d | 1d | 1d | 1d | 1d |
| −30 min at 200 °C | 5d | 1d | 1d | 2d | 1d |
| 5. Thermal endurance | 120 °C | 155–165 °C | 155–165 °C | 155 °C | 165 °C |
| 6. Tensile strength | good | good | good | good | good |
| 7. Flexibility | 20%+1d | 20%+1d | 24%+1d | 20%+1d | 28%+1d |
| 8. Resistance to abrasion | 10–30 | 20–60 | 40–80 | 50–80 | 40–60 |
| 9. Pencil hardness | | | | | |
| —on delivery | 4 H | 5 H | 5 H | 5 H | 5 H | the first and second formula under B above can be obtained by the well-known reaction of trimellitic anhydride with the corresponding isocyanates in a stoechiometric excess. French Pat. No. 1,375,461 teaches that dicarboxylic acid anhydrides react with isocyanates to give the corresponding imides, with evolution of $CO_2$.

The compounds B may be used in the new composition with their isocyanate groups in blocked form. Phenols, especially phenol itself and cresol, are suitable for blocking the isocyanate groups.

The two components A and B do not react in the cold when dissolved in phenol or mixtures of a phenol and solvent naphtha. However as soon as they pass, after application to the electrical conductor, into the reaction zone of the oven which is at about 300°–600°C, the phenol is split off and reaction with polyurethane formation occurs.

Sometimes it is necessary for the application of the varnishes to the wires to have a higher viscosity as if is obtained just by mixing the two components A and B described above, or the viscosity has — for the same reason — to be increased to allow a higher percent of hydrocarbons — which are decreasing the viscosity very rapidly — in the solvent mixture. These difficulties can be easily overcome by prereacting the components to the desired viscosity as it is illustrated in the examples 4 and 5. No change of properties or stability of the varnish can be observed.

The enamel composition according to the invention may be used with advantage interalia in the manufacture of normally-stressed smaller and medium-size recommutator motors. This new development results in good mechanical properties, good non-friction properties and, most important of all, in higher thermal resistance. Besides having a temperature index of 155, the wires thus obtained have a cut-thru temperature of 250°C and above.

The temperature index is determined by the test according to CEI-Publication 172. It gives an indication of the behaviour of the wires in heat, but does not necessarily refer to the service temperature at which the wires can be used.

Actual experience to date has shown that these wires perform very well in Class F motors (temperature index: 155°C).

In the case of enamels which are intended for thicker wires, it is of advantage to add polyhydantoins, for example a polyhydantoin of formula:

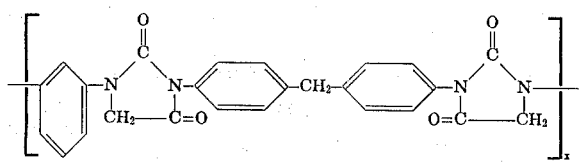

This has a favourable effect on the levelling of the lacquer and the flexibility and capacity for soldering of the stoved layer.

In the case of fine wires, an addition of epoxy resins, for example "Epikote" (registered tradename) can have a favourable effect on the running range and on the levelling. The running range indicates the range of running speed at a given temperature or conversely the range of temperature at a given running speed, within which the properties characteristic of each particular type of enamelled wire are achieved.

The properties of thus enamelled wires were determined in accordance with the following test methods:

| | |
|---|---|
| Pressure whilst hot: | CEI Publ. 251.1 (Comite Electr. Intern.) |
| Heat shock: | CEI Publ. 251.1 |
| Abrasion resistance, unilateral: | NEMA MW-1000 (National Electr. Manuf. Assoc.) |
| Abrasion resistance, bilateral: | NEMA MW-1000 (method) |
| | NEMA MW 15-1959 (load) |
| Solvent resistance: | VSM 23,715. |

Depending on the starting materials chosen, the wires enamelled according to the invention can already be soldered at temperatures of 320° to 350°C.

EXAMPLE 1

960 g (5 moles) of trimellitic anhydride, 75 g (1 mole) of glycine, and 396 g (2 moles) of p,p'-diaminodiphenylmethane are weighed out into a small reaction apparatus equiped with stirrer, thermometer and condenser, and are suspended in 3,000 g of cresol. The reaction starts at 130° to 140°C and the imide having free

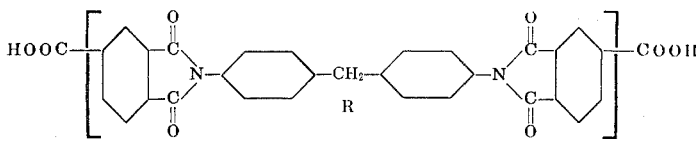

and

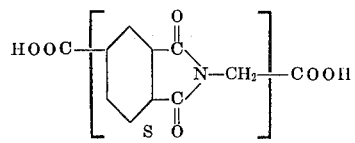

esterifiable carboxyl groups is formed with elimination of water. In this step, imidodicarboxylic acids of the following two structural formulae form alongside one another:

After the water has distilled off, the temperature is allowed to drop somewhat and 93 g (1,5 moles) of ethylene glycol, 150 g (1 mole) of triethylene glycol, 268 g (2 moles) of trimethylolpropane and 9 g of lead acetate are added.

The temperature is again raised, whereupon the esterification takes place with water being eliminated. The total reaction time at 200°C is 8 to 10 hours.

As a result of the esterification, the carboxyl groups which are still free in the formulae are blocked by the difunctional of trifunctional alcohols, so that a corresponding difunctional or polyfunctional alcohol is produces, for example

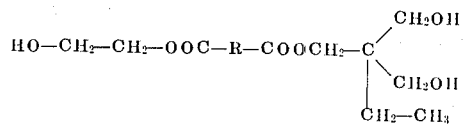

wherein R denotes the part of the above formula which is between the brackets. A corresponding ester can also be formed analogously with S.

The temperature is allowed to drop and 300 g of solvent naphta are added with constant stirring.

These alcohols can be reacted with polyfunctional isocyanates, for example the reaction product of trimethylolpropane and toluylenediisocyanate, blocked with phenol.

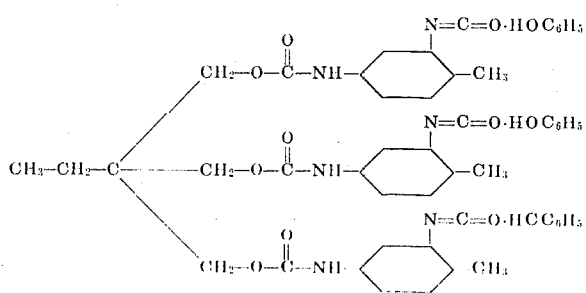

1,800 g thereof are added at 100° to 110°C.

After filtering and adjusting to a suitable viscosity for the chosen application device, thin wires down to 0,30 mm can be enamelled with this enamel using felt wipers; these wires can be soldered at 330° to 340°C in a tin bath in 3 seconds. The cut-thru according to the CEI method is about 250°C.

EXAMPLE 2

The reaction is carried out like example 1, but the following components are used for the preparation of the hydroxylgroup containing esterimide:

| | |
|---|---|
| 960 g (5 moles) | trimellitic acid anhydride |
| 150 g (2 moles) | glycine |
| 297 g (1,5 moles) | p,p'-diamino-diphenyl-methane |
| 3000 g | cresylic acid |
| 124 g (2 moles) | ethylene glycol |
| 134 g (1 mole) | trimethylolpropane |
| 261 g (1 mole) | tris-(2-hydroxyethyl) isocyanurate |
| 92 g (1 mole) | glycerine |
| 9 g | lead acetate |

After imide-formation and esterification 3000 g of solvent naphta and 2,000 g of the reaction product of trimethylolpropane and toluylene-diisocyanate, blocked with phenol — see example 1 — are added.

Copper wires (diameter 0.30 mm) enameled with such varnish are solderable at 320° to 330°C in 3 seconds. Cut-thru 250°C.

EXAMPLE 3

Reaction is carried out as described in example 1. The hydroxylgroup containing esterimide is based on the following components:

| | |
|---|---|
| 960 g (5 moles) | trimellitic acid anhydride |
| 225 g (3 moles) | glycine |
| 198 g (1 mole) | p,p'-diamino-diphenyl-methane |
| 300 g | cresylic acid |
| 62 g (1 mole) | ethylene glycol |
| 225 g (1,5 moles) | triethyleneglycol |
| 134 g (1 mole) | trimethylolpropane |
| 261 g (1 mole) | tris-(2-hydroxyethyl) isocyanurate |
| 9 g | lead acetate |

3,000 g solvent-naphta and 1,800 g of the reaction product of trimethylolpropane and toluylene-diisocyanate, blocked with phenol are added, similarly as described in example 1.

Copper wires of 0,30 mm diameter enameled with this varnish are solderable at 330°C. Cut-thru 240°C.

EXAMPLE 4

960 g (5 moles) of trimellitic anhydride, 75 g (1 mole) of glycine, 396 g (2 moles) of diamino-diphenyl-methane, 93 g (1,5 moles) of ethylene glycol, 150 g (1 mole) of triethylene glycol, 268 g (2 moles) of trimethylolpropane, 9 g of lead acetate and 3000 g of cresol are warmed directly in the same apparatus as in example 1. A colour change takes place at 130° to 140°C and on further raising the temperature water distils. The temperature is kept at 200°C for 8 to 10 hours.

The chemical reactions in this first reaction stage correspond to those from example 1.

In a second vessel, 1,080 g (4,32 moles) of p,p'-diisocyanato-diphenyl-methane are warmed to 170°C. 415 g (2,16 moles) of trimellitic anhydride are added in portions. 15 minutes after completion of the addition, 1,500 of cresol are introduced. g of The reactions correspond to the following equations:

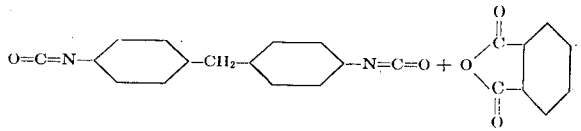

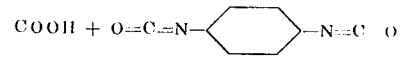

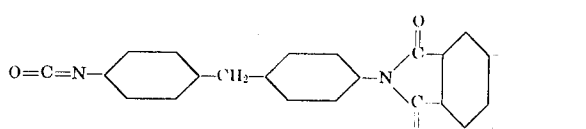

The isocyanate groups are blocked by the cresol.

After 15 minutes, this solution is combined with that of the first product and allowed to react for at least 30 minutes at 150°C, that is to say until a cooled sample is clear. 900 g of Resistherm PH 10 of Bayer, Leverkusen are further added to this solution and the mixture is diluted with about 3,000 g of Solvesso 100.

The viscosity is adjusted to 1,000 cP and 36 % solids content. The enamel is applied by means of nozzle wipers onto a wire of 1 mm diameter and stoved. The wire can be soldered in a tin bath at 380°C. It shows a resistance to pressure when hot of 270°C and performs well in the heat shock test at 175°C when wound on its own diameter.

Example 5

| | |
|---|---|
| 960 g (5 moles) | trimellitic acid anhydride |
| 75 g (1 mole) | glycine |
| 396 g (2 moles) | p,p'-diamino-diphenyl-methane |
| 225 g (1,5 moles) | triethylene glycol |
| 268 g (2 moles) | trimethylol propane |
| 92 g (1 mole) | glycerine |
| 9 g | lead acetate |
| 3000 g | cresylic acid | are reacted as described in example 4.

This product is mixed with ½ part by weight of the amount of the reaction product of p,p'-diamino-diphenyl-methane and trimellitic anhydride mentioned in example 4 and ½ part of the amount of the reaction product of trimethylolpropane and toluylene-diisocyanate mentioned in example 1 and reacted at a temperature of 150°C until a cooled down sample is clear. To this solution 900 g of Resistherm PH 10 (Bayer, Leverkusen) is added and diluted with 3,000 g of Solvesso 100. The viscosity is adjusted to 1,000 cP/20°C.

The varnish is applied by dies on a copper wire of 1 mm diameter and cured in the usual manner. The insulation is solderable at 360°C. Cut-thru 270°C. Heat-shock at 180°C ld.

EXAMPLE 6

I. 192 g (1 mole) of trimellitic acid anhydride is reacted with 61 g (1 mole) of 2-amino-ethanol-1 and 500 g (2 moles) of diisocyanatodiphenyl-methane are allowed to act on the imidohydroxycarboxylic acid, whereby one isocyanate group reacts with the hydroxyl group and the other reacts with the carboxyl group of the imidohydroxycarboxylic acid, but 2 terminal isocyanate groups still remain, so that a molecule with two free isocyanate groups is produced.

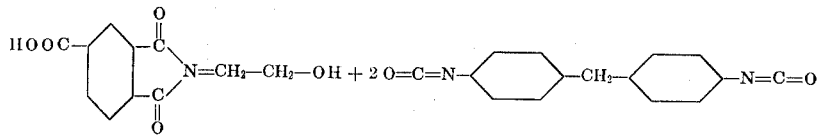

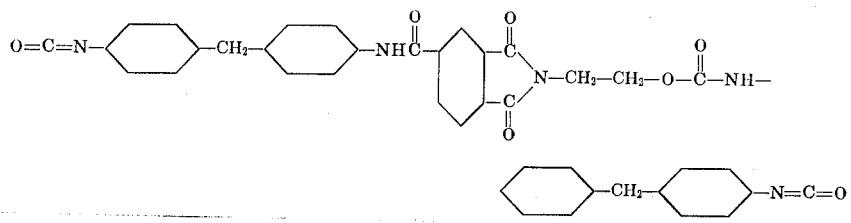

II. On the other hand, the reaction product of 134 g (1 mole) of trimethylolpropane and 522 g (3 moles) of toluylene-diisocyanate (Desmodur L, Bayer Leverkusen) is condensed with 3 moles of a 2- or 3-functional alcohol, and a condensation product with 6 urethane groups and free alcohol groups is thus obtained.

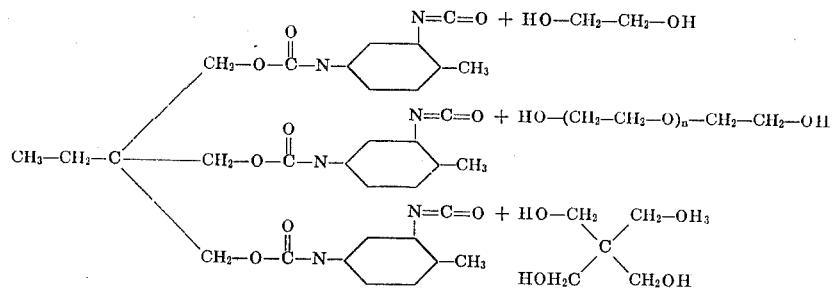

The corresponding wire enamel is produced by reaction of stoichiometric amounts of I and II.

A wire of 0,6 mm diameter has a resistance to pressure when hot of 230°C and can be soldered in a tin bath at 335°C.

EXAMPLE 7

I. Corresponding to example 4. 1080 g (4,32 moles) of p,p'-diisocyanatodiphenyl-methane are heated up to 170°C followed by addition of 415 g (2,16 moles) of trimellitic acid anhydride. After 15 minutes 1,500 g of cresylic acid are added and the solution is cooled down to room temperature.

II. Similar to example 6, part II, 134 g (1 mole) of trimethylolpropane and 522 g(3 moles) of toluylendiisocyanate (Desmodur L of Bayer) are reacted with 180 g (2 moles) butanediol and 134 g (1 mole) trimethylolpropane. The corresponding wire enamel is obtained by mixing stoechiometric amounts of I and II.

A copper wire of 0,6 mm diameter enameled with this varnish is solderable in a tin bath at 320° to 330°C. Cut-thru 240°C.

We claim:

1. A varnish composition to be used for the manufacture of solderable enameled wires consisting essentially of the polyurethane reaction product of a hydroxyl compound A and an isocyanate compound B selected in respect to each other so that at least one thereof contains imide groups and reacted with each other in a stoichiometric ratio of the hydroxyl groups and isocyanate groups and wherein said compound A is selected from alcohols of the formulae:

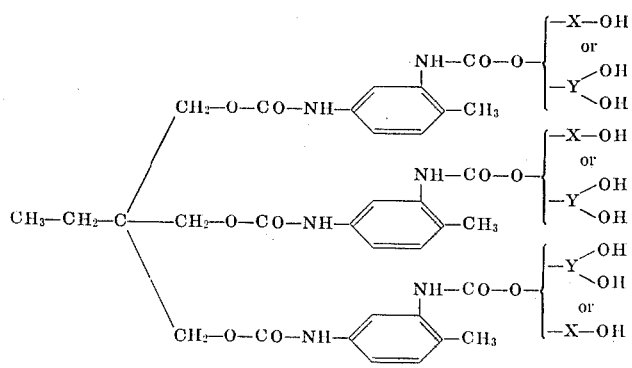

wherein X means $-(CH_2)_m-$, $-(CH_2CH_2O)_n-CH_2CH_2-$ and $-CH_2CHCH_2-$
$\qquad\qquad\qquad\qquad\qquad\qquad\qquad\qquad\qquad\quad |$
$\qquad\qquad\qquad\qquad\qquad\qquad\qquad\qquad\qquad\,\,\,OH$ $m$ being an integer from 2 to 4 and $n$ being an integer from 1 to 2 and Y means

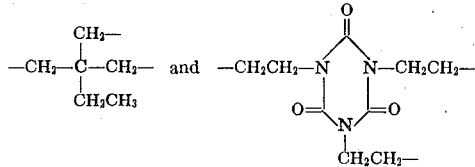
and the ratio X:Y is of from 1:2 to 2:1, and said compound B is selected from isocyanates of the formulae:
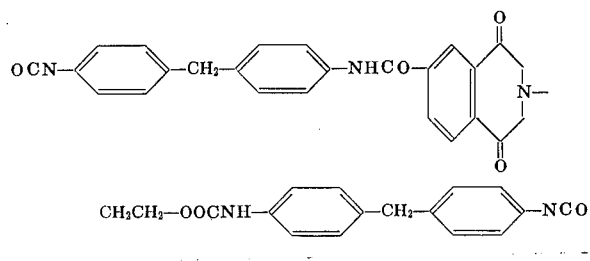
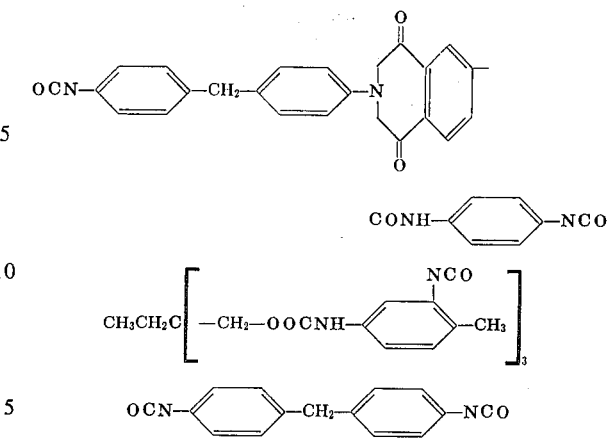
and mixtures thereof.
2. An enamel composition according to claim 1, in which the isocyanate groups of compound B are blocked by a phenolic compound which upon exposure to heat splits off, thus liberating the isocyanate groups for the reaction with compound A.
* * * * *